US012566709B2

(12) United States Patent

Nagaraja et al.

(10) Patent No.: US 12,566,709 B2
(45) Date of Patent: Mar. 3, 2026

(54) TILE LEVEL INTERCONNECT DESIGN FOR CENTRAL PROCESSING UNIT IMAGE ACCESS PATTERNS

(71) Applicant: QUALCOMM Incorporated, San Diego, CA (US)

(72) Inventors: Keshava Prasad Nagaraja, Bangalore (IN); Shivanand Shashikanth Aski, Bagalkot (IN); Krishnaprasad Mahendrakar, Bangalore (IN); Andrew Edmund Turner, San Diego, CA (US); Siddesh Halavarthi Math Revana, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 18/633,279

(22) Filed: Apr. 11, 2024

(65) Prior Publication Data

US 2025/0321893 A1     Oct. 16, 2025

(51) Int. Cl.
| | |
|---|---|
| *G06F 12/08* | (2016.01) |
| *G06F 12/0811* | (2016.01) |
| *G06F 12/0875* | (2016.01) |
| *H04N 19/15* | (2014.01) |

(52) U.S. Cl.
CPC ...... *G06F 12/0875* (2013.01); *G06F 12/0811* (2013.01); *H04N 19/15* (2014.11); *G06F 2212/455* (2013.01)

(58) Field of Classification Search
CPC .......................... G06F 12/0875; G06F 12/0811
See application file for complete search history.

(56) References Cited

U.S. PATENT DOCUMENTS

| | | | | |
|---|---|---|---|---|
| 2002/0091892 A1* | 7/2002 | Vondran, Jr. | ........ | G06F 9/30156 711/3 |
| 2007/0043902 A1* | 2/2007 | Flake | .................... | G06F 3/0674 711/E12.019 |

* cited by examiner

*Primary Examiner* — Jae U Yu
(74) *Attorney, Agent, or Firm* — Loza & Loza LLP

(57) ABSTRACT

Aspects of the disclosure are directed to providing access to multimedia data in a tile format. In accordance with one aspect, the disclosure includes detecting one or more dependencies of a first tile read request with a second tile read request by classifying a head node and a dependent node; sending the first tile read request to a main memory; storing the dependent node in a buffer; and outputting a first cache line and a second cache line using the first tile read request.

15 Claims, 8 Drawing Sheets

100

600

611

612

613

614

615

616

617

618

Read request

Write request

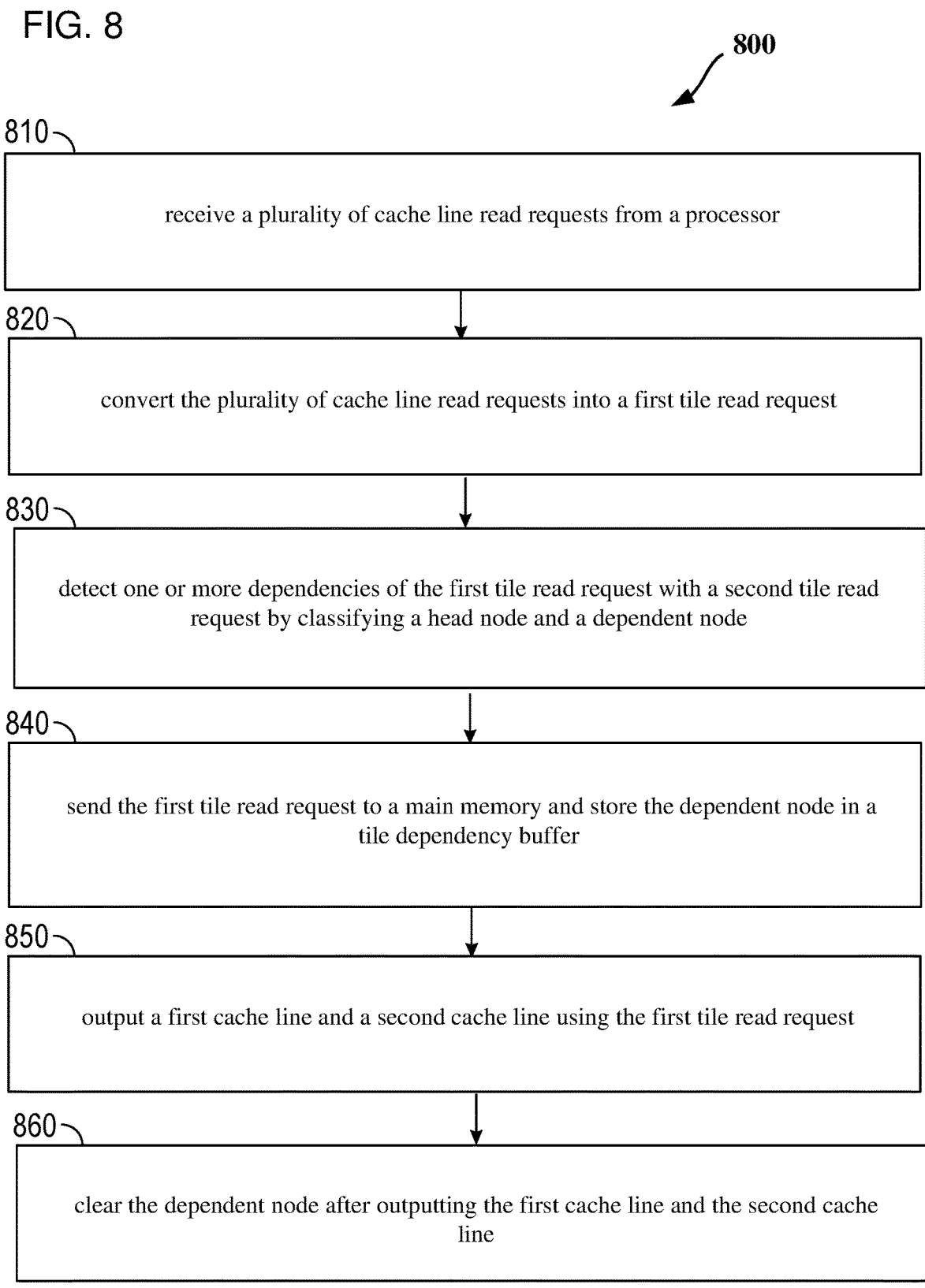

810 — receive a plurality of cache line read requests from a processor

820 — convert the plurality of cache line read requests into a first tile read request 830 — detect one or more dependencies of the first tile read request with a second tile read request by classifying a head node and a dependent node 840 — send the first tile read request to a main memory and store the dependent node in a tile dependency buffer 850 — output a first cache line and a second cache line using the first tile read request 860 — clear the dependent node after outputting the first cache line and the second cache line

TILE LEVEL INTERCONNECT DESIGN FOR CENTRAL PROCESSING UNIT IMAGE ACCESS PATTERNS

TECHNICAL FIELD

This disclosure relates generally to the field of computer processor architecture, and, in particular, to providing energy-efficient central processing unit (CPU) access to multimedia data in a tile format.

BACKGROUND

An information processing system, for example, a computing platform, strives for fast throughput, large main memory capacity and low energy usage. One application which requires fast throughput is the access of multimedia traffic by a central processing unit (CPU) where the multimedia traffic has been source encoded (e.g., image compressed) and stored in a tile format. An improvement in CPU access to such tile-formatted multimedia traffic is desired in many user scenarios.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides energy-efficient central processing unit (CPU) access to multimedia data in a tile format. Accordingly, an apparatus including: a tile computation block configured to detect one or more dependencies of a first tile read request with a second tile read request by classifying a head node and a dependent node; a tile hazard block coupled to the tile computation block, the tile hazard block configured to store the dependent node; and a tile level handler coupled to tile hazard block, the tile level handler configured to output a first cache line and a second cache line.

In one example, the tile level handler is further configured to use the first tile read request to output the first cache line and the second cache line. In one example, the tile hazard block is further configured to store the dependent node in a buffer.

In one example, the apparatus further includes a scheduler coupled to the tile level handler, the scheduler configured to detect one or more dependencies between an incoming tile read request and a previous tile read request. In one example, the scheduler is further configured to detect the one or more dependencies between an incoming tile read request and the previous tile read request by identifying a dependent node in the incoming tile read request.

Another aspect of the disclosure provides an apparatus for implementing access to a multimedia data in a tile format, the apparatus including: means for storing a first cache line and a second cache line in the tile format; means for detecting one or more dependencies of a first tile read request with a second tile read request by classifying a head node and a dependent node; means for sending the first tile read request to a main memory; means for storing the dependent node; means for outputting the first cache line and the second cache line using the first tile read request; and means for clearing the dependent node after outputting the first cache line and the second cache line.

Another aspect of the disclosure provides a method including: detecting one or more dependencies of a first tile read request with a second tile read request by classifying a head node and a dependent node; sending the first tile read request to a main memory; storing the dependent node in a buffer; and outputting a first cache line and a second cache line using the first tile read request.

In one example, the first cache line or the second cache line is a multimedia data. In one example, the method further includes storing the first cache line and the second cache line in a tile format. In one example, the method further includes clearing the dependent node after outputting the first cache line and the second cache line. In one example, the method further includes converting a plurality of cache line read requests into the first tile read request. In one example, the first tile read request corresponds to a first of the plurality of cache line read requests. In one example, the second tile read request corresponds to a second of the plurality of cache line read requests.

In one example, the method further includes receiving the plurality of cache line read requests from a processor. In one example, the method further includes classifying the first tile read request as the head node and classifying the second tile read request as the dependent node. In one example, the head node and dependent node are associated with a tile. In one example, the tile is a compression unit of an image and wherein the tile has a size which depends on a compression ratio.

In one example, the method further includes detecting one or more dependencies of the first tile write request with a tile write request. In one example, a detection of the one or more dependencies of the first tile read request with the second tile read request or of the one or more dependencies of the first tile read request with the tile write request is facilitated by a tree-based data structure based on ordering of incoming read requests or write requests. In one example, the detection provides a dynamic switching between one or more read and write access paths of a main memory if there are dependencies among the first tile read request, the second tile read request, and the tile write request.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

BRIEF DESCRIPTION OF THE DRAWINGS

FIG. 8 illustrates an example flow diagram for central processing unit (CPU) access to tile-formatted data with a plurality of cache lines.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
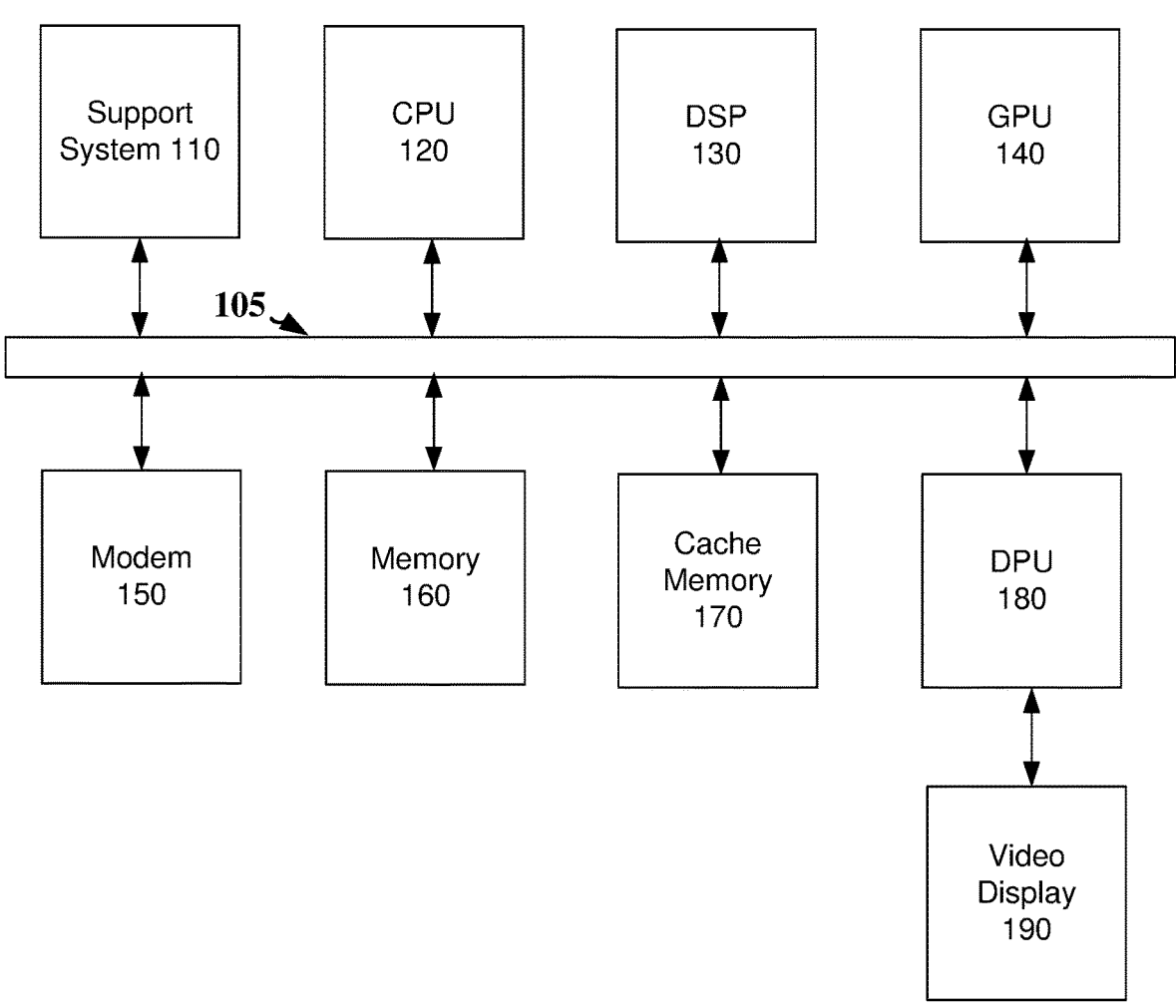
FIG. 1 illustrates an example information processing system.

FIG. 1 illustrates an example information processing system 100. In one example, the information processing system 100 includes a plurality of processing engines, or processor cores, such as a central processing unit (CPU) 120, a digital signal processor (DSP) 130, a graphics processing unit (GPU) 140, a display processing unit (DPU) 180, etc. In one example, various other functions in the information processing system 100 may be included such as a support system 110, a modem 150, a memory 160, a cache memory 170 and a video display 190. For example, the plurality of processing engines and various other functions may be interconnected by an interconnection databus 105 to transport data and control information. For example, the memory 160 and/or the cache memory 170 may be shared among the CPU 120, the GPU 140 and the other processing engines. In one example, the CPU 120 may include a first internal memory which is not shared with the other processing engines. In one example, any processing engine of the plurality of processing engines may have an internal memory (i.e., a dedicated memory) which is not shared with the other processing engines.

Figure 2:
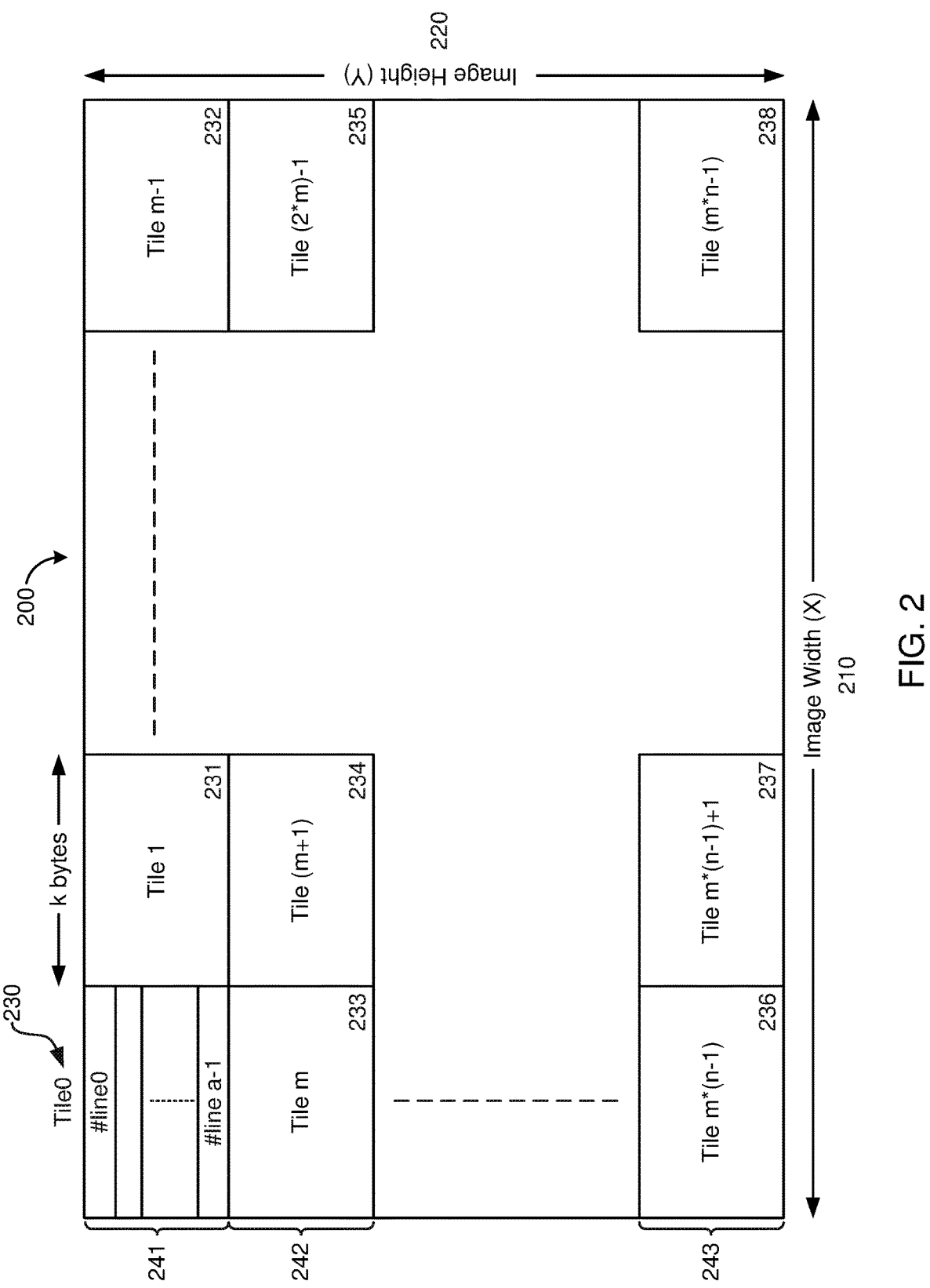
FIG. 2 illustrates an example image with a tile format.

FIG. 2 illustrates an example image 200 with a tile format. In one example, the image 200 is a two-dimensional array of data which is used to represent a static picture or a dynamic picture (e.g., video). The image 200 may be organized in a rectangular geometry with a horizontal dimension and a vertical dimension. In one example, the horizontal dimension has an image width X 210 (in bytes) in a row and the vertical dimension has an image height Y 220 (in bytes) in a column. In one example, the image 200 includes a plurality of pixels where each pixel of the plurality of pixels is a picture element. In one example, each pixel is specified in an image format. For example, the image format may be a red/green/blue (RGB) format to represent three color components in a polychromatic image. For example, the image format may be a luminance/chrominance (YUV) format, where Y represents a luminance component and U and V represent two color components. In one example, each pixel may be specified by a pixel depth to define a quantity of bits in each pixel. For example, a pixel depth of 24 bits may be used to represent 8 bits of intensity for each color component of a set of three color components (e.g., RGB).

In one example, the image 200 is decomposed into a plurality of tiles. In one example, each tile of the plurality of tiles is a compression unit with a size which depends on a compression ratio. In one example, image compression is used as a source encoding technique to reduce a quantity of bits in the image. In one example, image compression is performed on portions of the image 200 separately to produce the plurality of tiles. In one example, the reduction of quantity of bits in the image 200 is specified by the compression ratio. For example, the compression ratio is a ratio of uncompressed bits to compressed bits in each tile.

In one example, the image width X 210 (in bytes) is related to a number of tiles in a row m via the formula m=X/K, where K=number of bytes per tile in the row.

In one example, each tile of the plurality of tiles after decompression unwraps into a plurality of cache lines which depends on the image format. In one example, A=number of cache lines per tile and is determined by the image format (e.g., RGBA, NV12, TP10, etc.). In one example, a number of tiles in a column n is determined via the formula n=Y/A.

In one example, the plurality of tiles with m columns includes a first tile 230 (e.g. tile 0), a second tile 231 (e.g., tile 1) and so on until a third tile 232 (e.g., tile (m−1)) in a first row 241. In one example, the plurality of tiles includes a fourth tile 233 (e.g., tile m), a fifth tile 234 (e.g., tile (m+1)) and so on until a sixth tile 235 (e.g., tile 2m−1) in a second row 242. In one example, the plurality of tiles includes a seventh tile 236 (e.g., tile m(n−1)), an eighth tile 237 (e.g., tile m(n−1)+1) and so on until a ninth tile 238 (e.g., tile mn−1) in a nth row 243.

In one example, the CPU accesses the image 200 using cache line data which is indirectly mapped to a tile unit. For example, a requested cache line may be extracted by decompressing the tile unit. In one example, if the CPU requests continuous access to the cache line data which are part of a single tile, then a tile level interconnect logic may detect a duplicate tile request and may send only one memory request to a main memory (e.g., DDR memory). In one example, the duplicate tile request for a particular tile specifies cache lines from that particular tile for which a memory access request has been sent already. In one example, detection of the duplicate tile request minimizes unnecessary memory access bandwidth and dc power utilization and may also improve memory access latency.

Figure 3:
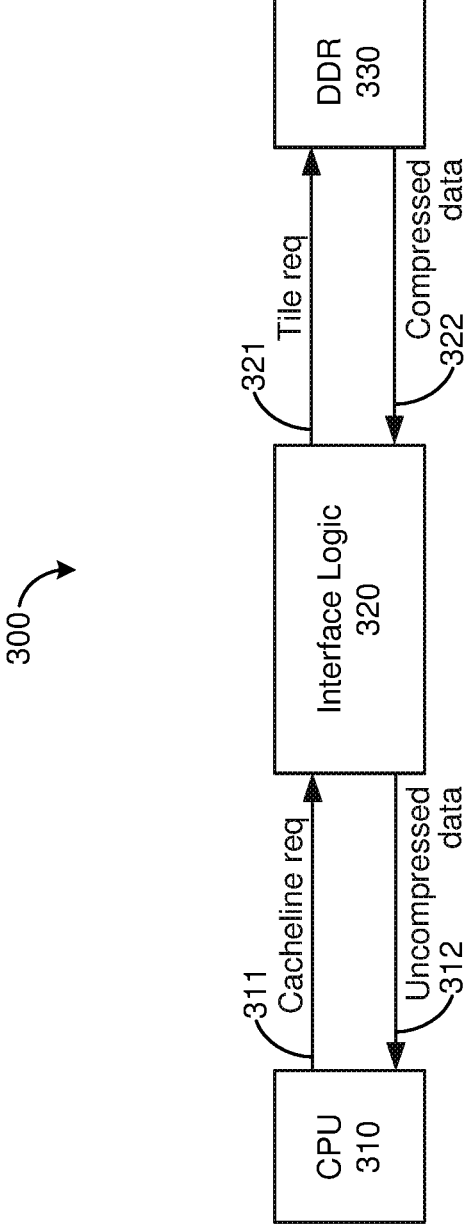
FIG. 3 illustrates an example memory access architecture.

FIG. 3 illustrates an example memory access architecture 300. In one example, the memory access architecture 300 includes a CPU 310, an interface logic 320 and a main memory 330 (e.g., DDR memory). In one example, the CPU 310 sends a plurality of cache line request messages 311 to the interface logic 320 which converts it to a tile request message 321 sent to the main memory 330. In one example, the main memory 330 retrieves compressed data 322 and sends it to the interface logic 320. In one example, the interface logic 320 includes a decompression module to convert compressed data 322 into uncompressed data 312 via a decompression algorithm. In one example, the uncompressed data 312 is sent from the interface logic 320 to the CPU 310.

In one example, when the CPU 310 attempts to access a plurality of cache lines of one tile using the plurality of cache line request messages, the interface logic 320 fetches the compressed image tile for each cache line and performs decompression using the decompression module. In one example, the fetching and decompression may impact performance and bandwidth utilization of the CPU 310.

In one example, to mitigate performance impacts, a vertical access pattern optimization mechanism may be implemented in the interface logic 320. In one example, the vertical access pattern optimization mechanism is implemented for a read vs read (RD vs RD) sequence.

In one example, a tile with a certain image format may have a plurality of cache lines, for example, four cache lines labeled as cache line A, cache line B, cache line C and cache line D. In one example, the interface logic 320 may detect dependencies among cache line B, cache line C and cache line D with respect to cache line A. In one example, dependent cache line requests of the plurality of cache line requests for cache line B, cache line C and cache line D may be stored in a buffer memory by the interface logic 320 after receiving the plurality of cache line requests. In one example, dependencies among the plurality of cache lines occur when the plurality of cache lines are in the same tile.

In one example, once a first compressed image tile is fetched from main memory in response for a first cache line request message of the plurality of cache line requests for cache line A, the first compressed image tile is decompressed using the decompression module to produce a first uncompressed data. In one example, the first uncompressed data includes uncompressed data for cache line A, cache line B, cache line C and cache line D and is sent to the CPU from uncompressed data storage. In this example, 75% of memory access bandwidth is saved, using the vertical access pattern optimization mechanism. In one example, ordering of the plurality of cache line requests is maintained throughout the vertical access pattern optimization mechanism.

Figure 4:
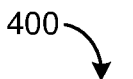
FIG. 4 illustrates an example graphical representation of cache line dependencies for read requests.
Figure 4:
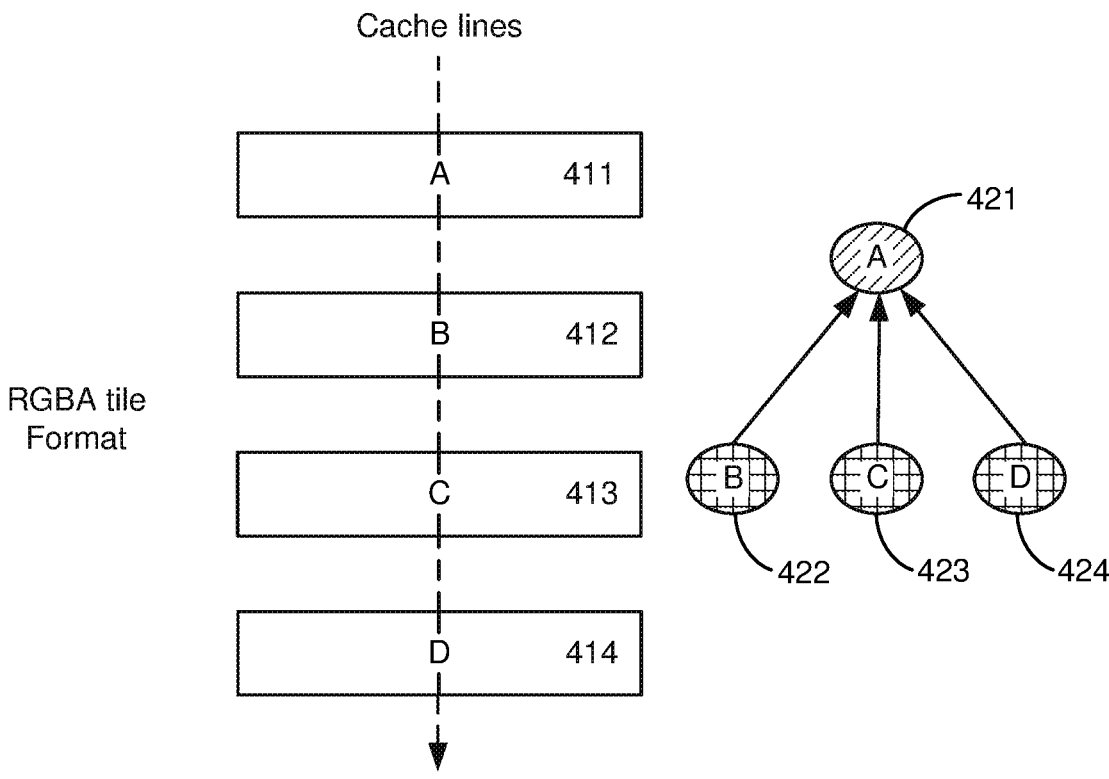

FIG. 4 illustrates an example graphical representation 400 of cache line dependencies for read requests. In one example, a tile includes a plurality of cache lines with a first cache line 411 (e.g. cache line A), a second cache line 412 (e.g., cache line B), a third cache line 413 (e.g., cache line C) and a fourth cache line 414 (e.g., cache line D). In one example, the graphical representation of cache line dependencies is illustrated with a first node 421 representing the first cache line 411 as an independent node and a second node 422, a third node 423 and a fourth node 424 as dependent nodes. In one example, a dependent node is a node which is in the same tile as an independent node. In one example, there is a one-to-one relationship between cache lines and nodes. In one example, the plurality of cache lines may be in a RGBA tile format, where RGBA refers to red, green, blue for a color format and to alpha for an opacity parameter.

Figure 5:
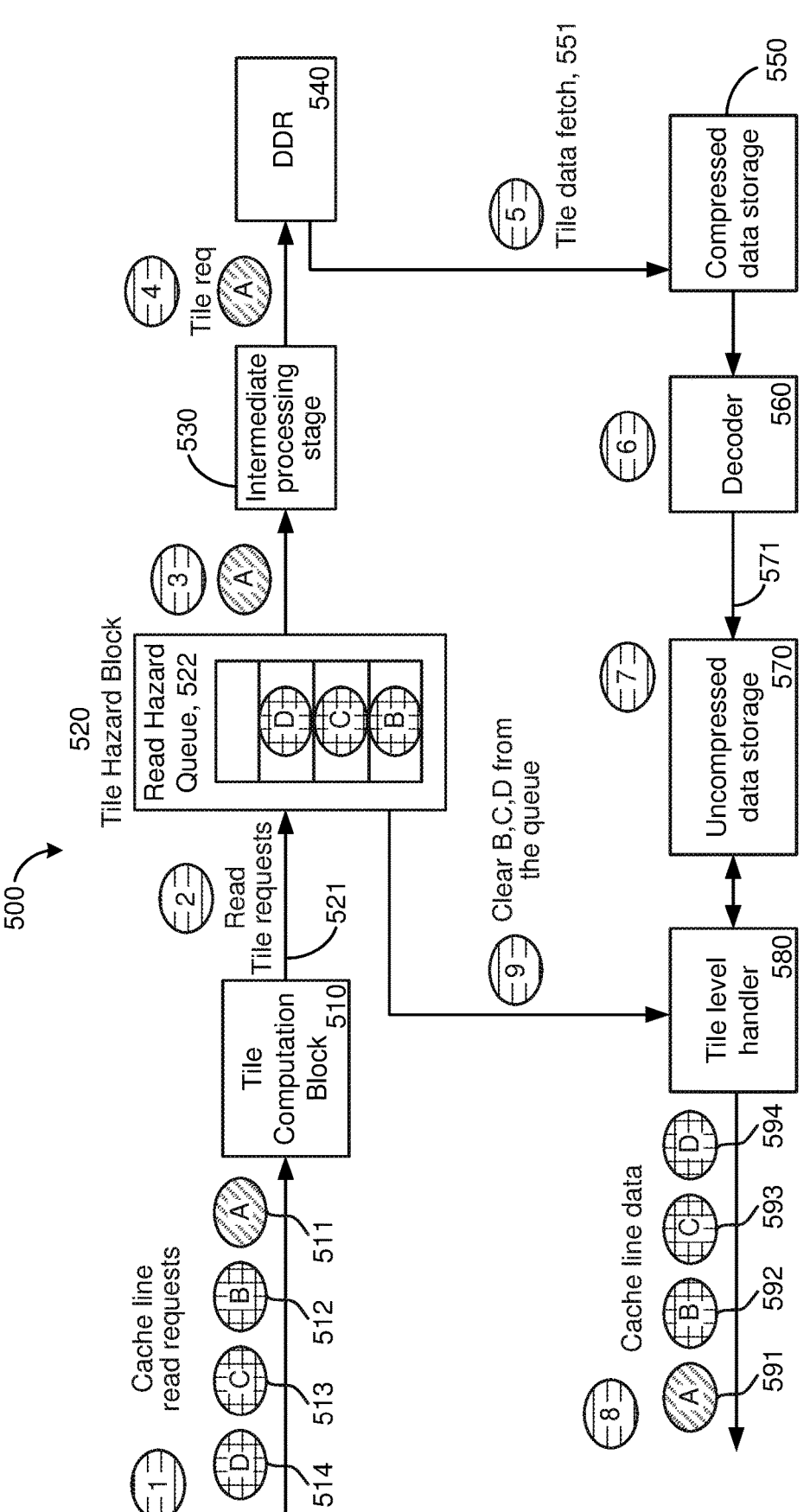
FIG. 5 illustrates an example read flow architecture with vertical traversal.

FIG. 5 illustrates an example read flow architecture 500 with vertical traversal. In one example, a tile computation block 510 receives a plurality of cache line read requests from a CPU consisting of a first cache line read request 511 (e.g., for cache line A), a second cache line read request 512 (e.g., for cache line B), a third cache line read request 513 (e.g., for cache line C) and a fourth cache line read request 514 (e.g., for cache line D). In one example, the tile computation block 510 converts the plurality of cache line read requests into a tile read request 521 which is sent to a tile hazard block 520.

In one example, the tile hazard block 520 includes a vertical traversal mechanism. In one example, the tile hazard block 520 sends a first tile read request for cache line A to an intermediate processing stage 530. In one example, the intermediate processing stage sends the first tile read request to a main memory 540 (e.g., DDR memory). In one example, the first tile read request is used to fetch tile data from the main memory 540. In one example, a second tile read request for cache line B, a third tile read request for cache line C and a fourth tile read request for cache line D are stored in a read hazard queue 522 in the tile hazard block 520.

In one example, the main memory 540 retrieves fetched tile data 551 from its storage and sends it to a compressed data storage 550 for temporary storage. In one example, the fetched tile data 551 is retrieved from temporary storage and sent to a decoder 560. In one example, the decoder 560 decompresses the fetched tile data and sends decompressed tile data 571 to a uncompressed data storage 570. In one example, the uncompressed data storage 570 retrieves decompressed tile data 571 to a tile level handler 580. In one example, the tile level handler 580 sends the decompressed tile data which correspond to the plurality of cache line read requests, to a CPU (not shown). In one example, the decompressed tile data includes a first decompressed cache line data 591, a second decompressed cache line data 592, a third decompressed cache line data 593 and a fourth decompressed cache line data 594. In one example, the tile level handler 580 also clears the second cache line read request, the third cache line read request and the fourth cache line read request from the read hazard queue 522 after the decompressed tile data is sent to the CPU.

Figure 6:
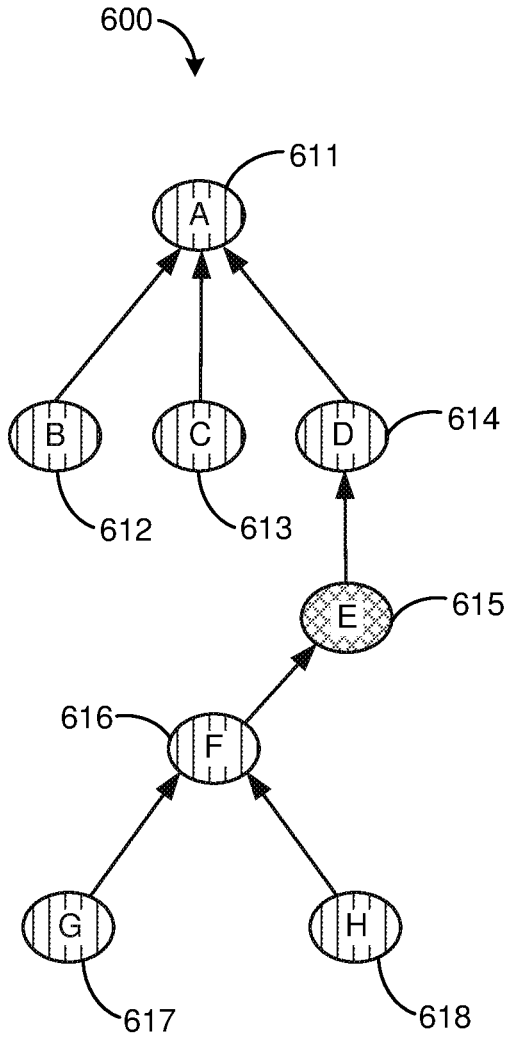
FIG. 6 illustrates an example graphical representation of cache line dependencies between read and write requests.
Figure 6:
Figure 6:

FIG. 6 illustrates an example graphical representation 600 of cache line dependencies between read and cache line write requests. In one example, the tile hazard block 520 (of FIG. 5) handles dependencies between cache line read requests and cache line write requests. For example, when a CPU sends different cache line read requests and cache line write requests of the same tile, the tile hazard block 520 may create a tree-based structure according to an ordering of incoming cache line read requests and cache line write requests. In one example, the tile hazard block 520 implements dynamic switching between read paths and write paths if there are dependencies between cache line read requests and cache line write requests.

In one example, FIG. 6 shows a graphical depiction of a plurality of cache line requests of the same tile denoted as A, B, C, D, E, F, G and H and with that ordering. In one example, cache line request E is a cache line write request and other cache line requests are cache line read requests.

In one example, A acts as a head node for B, C, D. For example, A, B, C, D are all cache line read requests. In one example, when E arrives at the tile hazard block 520, E is connected to D, where D acts as a head node for E. In one example, E is a cache line write request. In one example, a new cache line read request F is connected to E, where E acts as a head node for F. In one example, subsequent cache line read requests G and H are connected to F, where F acts as a head node for both G and H. In one example, once A, B, C, D cache line read requests are processed, E cache line write request is processed in the write path. In one example, as soon as E has completed processing, F, G, H cache line read requests are processed in the read path.

In one example, the graphical representation of cache line dependencies is illustrated with a first node 611 (i.e., A) as an independent node and a second node 612 (i.e., B), a third node 613 (i.e., C) and a fourth node 614 (i.e., D) as dependent nodes connected to the first node 611. In one example, a fifth node 615 (i.e., E) is connected to the fourth node 614. That is, the fourth node 614 is a head node for the fifth node 615. In one example, a sixth node 616 (i.e., F) is connected to the fifth node 615. That is, the fifth node 615 is a head node for the sixth node 616. In one example, a seventh node 617 (i.e., G) and an eighth node 618 (i.e., H) are connected to the sixth node 616. That is, the sixth node 616 is a head node for the seventh node 617 and the eighth node 618.

Figure 7:
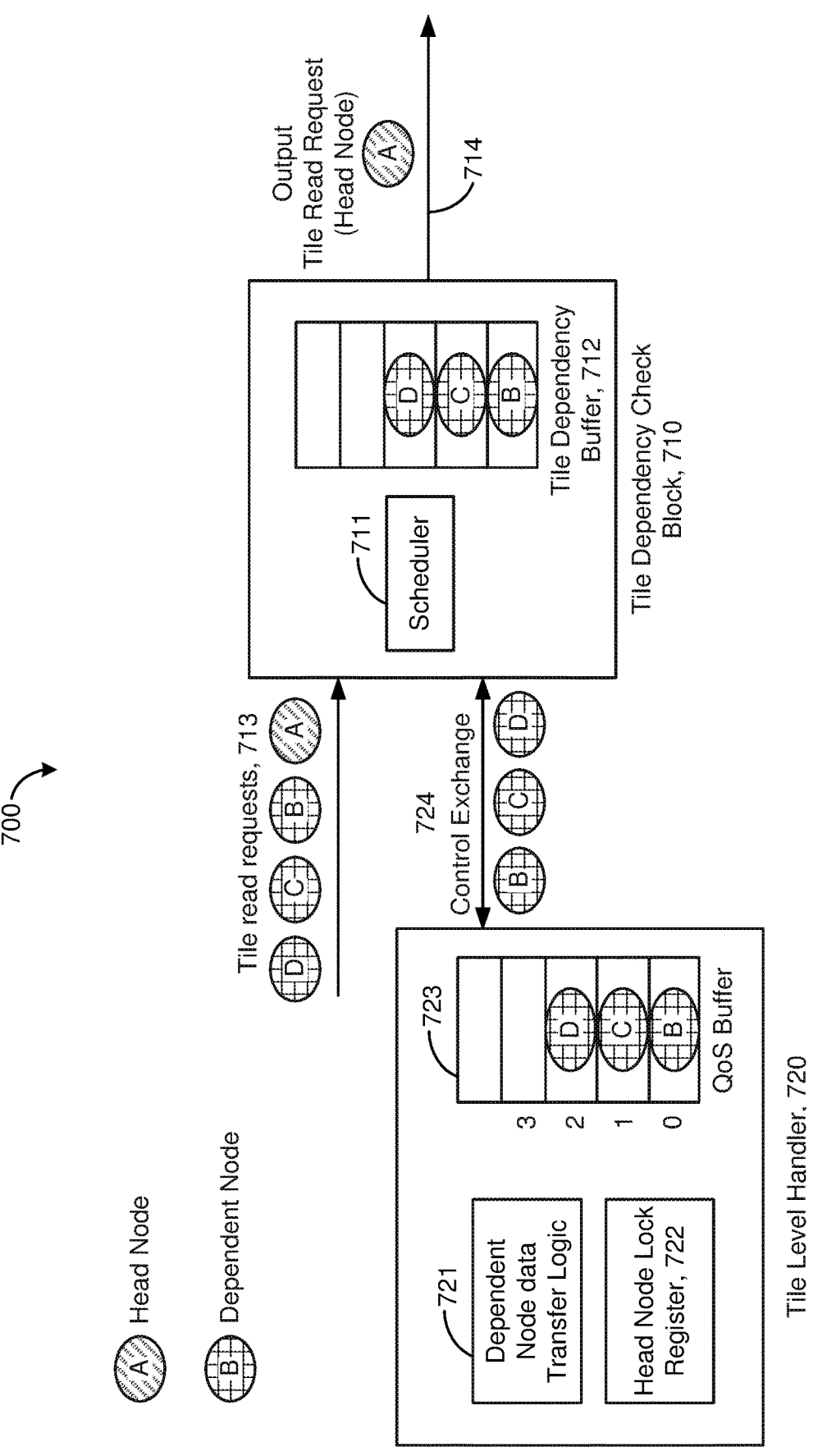
FIG. 7 illustrates an example tile dependency check implementation.

FIG. 7 illustrates an example tile dependency check implementation 700. In one example, a tile dependency check block 710 includes a scheduler 711 and a tile dependency buffer 712. In one example, a plurality of tile read requests 713 (e.g., A, B, C, D) are received by the tile dependency check block 710 where it is processed by the scheduler 711 for request disposition. In one example, the scheduler 711 detects dependencies between incoming tile read requests and previous tile read requests by identifying dependent nodes among the incoming tile read requests. In one example, the scheduler 711 stores the dependent nodes in the tile dependency buffer 712. In one example, the tile dependency check block 710 includes vertical traversal logic for incoming read traffic. In one example, the tile dependency check block 710 produces an output tile read request 714 for a first tile read request associated with A. In one example, the output tile read request 714 is destined for a main memory for requested data retrieval. In one example, the incoming read traffic includes a plurality of head nodes and a plurality of dependent nodes.

In FIG. 7, A, B, C, D are the plurality of tile read requests 713 where A is a head node and B, C, D are dependent nodes. In one example, the plurality of tile read requests 713 have an ordering A then B then C then D. In one example, the tile dependency check block 710 is part of the tile hazard block.

In one example, a tile level handler 720 includes a dependent node data transfer logic 721, a head node lock register 722 and a quality of service (QOS) buffer 723. In one example, the dependent node data transfer logic 721 transfers dependent node data to the CPU via an output interface. In one example, the head node lock register 722 locks the head node until the dependent nodes are being processed. In one example, the QoS buffer 723 maintains processing order for the dependent nodes. In one example, control exchange information 724 is exchanged between the tile dependency check block 710 and the tile level handler 720.

In one example, when the tile read request for A arrives at the tile dependency check block 710, it is sent to the main memory since it is a head node. In one example, control exchange information 724 for the dependent nodes B, C, D is sent to the tile level handler 720. In one example, when the tile read request for B enters the tile dependency check block 710, it is placed in the tile dependency buffer 712 and control exchange information 724 for dependent node B is sent to the tile level handler 720. In one example, the same process is repeated for the tile read request for C and for the tile read request for D. In one example, once the tile read request for A has been processed by subsequent stages, the tile level handler 720 commences processing of the dependent nodes B, C, D sequentially. In one example, the tile dependency buffer 712 is identical to the read hazard queue 522 of FIG. 5.

In one example, previous examples have illustrated scenarios with 4 cache lines per tile. In one example, the above examples may be generalized for arbitrary number of cache lines per tile, depending on the image format. For example, RGBA format has 4 cache lines per tile, NV12 format has 8 cache lines per tile, TP10 format has 16 cache lines per tile.

FIG. 8 illustrates an example flow diagram 800 for central processing unit (CPU) access to tile-formatted data with a plurality of cache lines. In block 810, receive a plurality of cache line read requests from a processor. In one example, a plurality of cache line read requests is received from a processor. In one example, the processor is a CPU. In one example, the plurality of cache line read requests is to obtain a plurality of cache lines. In one example, the plurality of cache lines are multimedia data. In one example, the plurality of cache lines is stored in a digitally compressed format in main memory. In one example, the plurality of cache lines is stored in a tile format in main memory. In one example, the plurality of cache lines is part of an image.

In block 820, convert the plurality of cache line read requests into a first tile read request. In one example, the plurality of cache line read requests is converted into a first tile read request. In one example, the first tile read request corresponds to a first cache line read request of the plurality of cache line read requests. In one example, a tile is a compression unit of the image. In one example, the tile has a size which depends on a compression ratio. In one example, the conversion is performed by a tile computation block.

In block 830, detect one or more dependencies of the first tile read request with a second tile read request by classifying a head node and a dependent node. In one example, one or more dependencies of the first tile read request with a second tile read request is detected by classifying a head node and a dependent node. In one example, the second tile read request corresponds to a second cache line read request of the plurality of cache line read requests. In one example, the detection classifies the first tile read request as the head node and classifies the second tile read request as the dependent node. In one example, the head node and dependent node are associated with the same tile. In one example, the second tile read request is stored in a tile dependency buffer. In one example, the detection is performed by a tile hazard block. In one example, the detection is performed by a tile dependency check block. In one example, the tile dependency check block is part of the tile hazard block.

In one example, the detection also detects dependencies among tile read requests and tile write requests. In one example, the detection is facilitated by a tree-based data structure based on ordering of incoming read requests and write requests. In one example, the detection provides dynamic switching between read and write access paths of the main memory if there are dependencies among tile read requests and tile write requests.

In block 840, send the first tile read request to a main memory and store the dependent node in a tile dependency buffer. In one example, the first tile read request is sent to a main memory and the dependent node is stored in a tile dependency buffer. In one example, the tile data includes a first cache line and a second cache line. In one example, the dependent node is classified as the second tile read request.

In block 850, output a first cache line and a second cache line using the first tile read request. In one example, a first cache line and a second cache line are outputted using the first tile read request. In one example, the first cache line and the second cache lines are retrieved from main memory. In one example, the first cache line and the second cache line are decompressed using a decompression algorithm in a decoder. In one example, the outputting is performed by a tile level handler. In one example, the tile level handler receives control information of the dependent node from the tile hazard block. In one example, the control information is stored in a quality of service (QOS) buffer.

In block 860, clear the dependent node after outputting the first cache line and the second cache line. In one example, the dependent node is cleared after outputting the first cache line and the second cache line. In one example, the clearing removes the second cache line request from the tile dependency buffer.

In one aspect, one or more of the steps for providing energy-efficient central processing unit (CPU) access to multimedia data in a tile format in FIG. 8 may be executed by one or more processors which may include hardware, software, firmware, etc. The one or more processors, for example, may be used to execute software or firmware needed to perform the steps in the flow diagram of FIG. 8. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

One skilled in the art would understand that various features of different embodiments may be combined or modified and still be within the spirit and scope of the present disclosure.

What is claimed is:

1. An apparatus for implementing access to a multimedia data in a tile format, the apparatus comprising:

means for storing a first cache line and a second cache line in the tile format;

means for detecting one or more dependencies of a first tile read request with a second tile read request by classifying a head node and a dependent node;

means for sending the first tile read request to a main memory;

means for storing the dependent node;

means for outputting the first cache line and the second cache line using the first tile read request; and means for clearing the dependent node after outputting the first cache line and the second cache line.

2. A method comprising:

detecting one or more dependencies of a first tile read request with a second tile read request by classifying a head node and a dependent node;

sending the first tile read request to a main memory;

storing the dependent node in a buffer; and outputting a first cache line and a second cache line using the first tile read request.

3. The method of claim 2, wherein the first cache line or the second cache line is a multimedia data.

4. The method of claim 2, further comprising storing the first cache line and the second cache line in a tile format.

5. The method of claim 2, further comprising clearing the dependent node after outputting the first cache line and the second cache line.

6. The method of claim 5, further comprising converting a plurality of cache line read requests into the first tile read request.

7. The method of claim 6, wherein the first tile read request corresponds to a first of the plurality of cache line read requests.

8. The method of claim 7, wherein the second tile read request corresponds to a second of the plurality of cache line read requests.

9. The method of claim 6, further comprising receiving the plurality of cache line read requests from a processor.

10. The method of claim 2, further comprising classifying the first tile read request as the head node and classifying the second tile read request as the dependent node.

11. The method of claim 10, wherein the head node and dependent node are associated with a tile.

12. The method of claim 11, wherein the tile is a compression unit of an image and wherein the tile has a size which depends on a compression ratio.

13. The method of claim 2, further comprising detecting one or more dependencies of the first tile write request with a tile write request.

14. The method of claim 13, wherein a detection of the one or more dependencies of the first tile read request with the second tile read request or of the one or more dependencies of the first tile read request with the tile write request is facilitated by a tree-based data structure based on ordering of incoming read requests or write requests.

15. The method of claim 14, wherein the detection provides a dynamic switching between one or more read and write access paths of a main memory if there are dependencies among the first tile read request, the second tile read request, and the tile write request.

* * * * *